US008857170B2

(12) United States Patent
Oxner et al.

(10) Patent No.: US 8,857,170 B2
(45) Date of Patent: Oct. 14, 2014

(54) GAS PRESSURE REDUCTION GENERATOR

(75) Inventors: Andrew Oxner, Reno, NV (US); Richard K. Langson, Carson City, NV (US)

(73) Assignee: ElectraTherm, Inc., Reno, NV (US)

( * ) Notice: Subject to any disclaimer, the term of this patent is extended or adjusted under 35 U.S.C. 154(b) by 895 days.

(21) Appl. No.: 12/982,167

(22) Filed: Dec. 30, 2010
(Under 37 CFR 1.47)

(65) Prior Publication Data
US 2012/0169049 A1 Jul. 5, 2012

(51) Int. Cl.
*F01C 21/04* (2006.01)
*F01C 1/16* (2006.01)
*F01K 7/00* (2006.01)
*H02K 7/18* (2006.01)

(52) U.S. Cl.
CPC .............. *F01C 1/16* (2013.01); *H02K 7/1823* (2013.01); *F01K 7/00* (2013.01); *F01C 21/04* (2013.01)
USPC ................................. 60/456; 60/398; 60/409

(58) Field of Classification Search
CPC ......... F01D 17/06; F01D 25/18; F01D 25/20; F15B 21/14; F01C 1/16; F01C 21/04; F01K 7/00; H02K 7/1823
USPC ............................. 60/398, 407, 409, 413, 456
See application file for complete search history.

(56) References Cited

U.S. PATENT DOCUMENTS

| | | | |
|---|---|---|---|
| 2,753,700 A * | 7/1956 | Morrison | 62/87 |
| 3,538,340 A | 11/1970 | Lang | |
| 3,751,673 A | 8/1973 | Sprankle | |
| 4,132,269 A | 1/1979 | Chasteen | |
| 4,228,657 A * | 10/1980 | Leo | 60/641.2 |
| 4,473,754 A | 9/1984 | Joy | |
| 5,117,908 A | 6/1992 | Hofmann | |
| 5,839,508 A | 11/1998 | Tubel et al. | |
| 6,296,461 B1 * | 10/2001 | Stosic | 418/201.3 |
| 6,981,377 B2 * | 1/2006 | Vaynberg et al. | 60/641.8 |
| 7,190,084 B2 | 3/2007 | Hall et al. | |
| 7,405,491 B2 | 7/2008 | Matsukuma et al. | |
| 7,537,051 B1 | 5/2009 | Hall et al. | |
| 7,669,419 B2 | 3/2010 | Juby et al. | |
| 8,215,114 B2 * | 7/2012 | Smith et al. | 60/657 |
| 2003/0178195 A1 | 9/2003 | Agee et al. | |
| 2005/0067005 A1 | 3/2005 | Van Der Spek | |
| 2005/0188689 A1 * | 9/2005 | Juby et al. | 60/413 |
| 2011/0175358 A1 | 7/2011 | Langson | |

FOREIGN PATENT DOCUMENTS

WO   WO 03-093649   11/2003
WO   WO 2009-098471   8/2009

OTHER PUBLICATIONS

International Search Report and Written Opinion of the International Searching Authority for International Application PCT/US2011/067846, mailed Aug. 17, 2012.

* cited by examiner

*Primary Examiner* — Ned Landrum
*Assistant Examiner* — Logan Kraft
(74) *Attorney, Agent, or Firm* — D.C. Williams

(57) ABSTRACT

A Gas Pressure Reduction Generator (GPRG) System and a method for implementing a GPRG System is provided, where the GPRG System includes a gas inlet configured to receive a pressurized gas flow from a gas supply, at least one expander in flow communication with the gas inlet to receive the pressurized gas flow, wherein the expander is operable to convert the pressurized gas flow into mechanical energy and a depressurized gas flow and a generator associated with the expander, wherein the generator is configured to convert the mechanical energy into electrical energy.

37 Claims, 3 Drawing Sheets

GAS PRESSURE REDUCTION GENERATOR

BACKGROUND

Whether from coal beds, oil fields, geopressured reservoirs, or other sources, production of natural gas (methane and other hydrocarbon gases) occurs in concentrated geological settings located mostly remote from the point of use. Increasingly, natural gas is shipped by ocean in liquefied form via tankers.

Compressors are used to increase the pressure of this gas and thereby reduce its volume for transport in these pipelines. The pressure also provides the motive force to move the gas down the pipe and to overcome friction losses along the way. Compressing this gas requires input energy, for a given quantity of gas, which is roughly equal to the product $P\Delta V$, where P is pressure and $\Delta V$ is the change in volume. Conversely, reducing the pressure of a gas under pressure via controlled expansion in a mechanical device recovers a portion of the energy which was previously invested during its compression.

Compressed gases exist in other processes as well, including those naturally pressurized at the wellhead such as carbon dioxide, helium, nitrogen and other gases, those compressed or generated at high pressure by industrial processes, including cryogenics, refrigeration, oil refining, chemical synthesis, and those compressed for the sole purpose of energy storage.

Regardless of the source of the pressurized gas, the need to reduce the pressure of the gas is typical. It also happens that the pressures needed to economically transport the gas over long distances are typically much higher than the pressures needed to distribute the gas locally, and also higher than typical users require. Currently, there are two common methods for reducing the pressure of the gas. The first method involves the use of a pressure reducing valve, regulator, or throttle, such an isenthalpic device that reduces the pressure. Unfortunately however the application of this method is undesirable because it causes the entropy of the gas to rise where this increase in entropy is irreversible, and represents a waste of energy. The second method uses a controlled expansion through a mechanical device, such as a turbine or a positive displacement mechanism, which extracts work from the gas. And by aspiring to an isentropic process, this second method recovers some of the input energy, leading to an overall higher process efficiency. Unfortunately, this second method also results in some undesirable consequences.

For example, regarding the use of a turbine, the controlled expansion of the gas via a turbine has several inherent problems. First, because the demand for gas varies with time and turbo-machinery has a narrow operating range for optimum efficiency, use of a turbine typically does not result in optimum efficiency. Second, gas can contain impurities which, due to the high differential velocity of the gas and the turbine rotor, can cause erosion and eventual failure of turbine components. Third, the price per watt of turbines under 1 MW in size increases substantially due in part to increasing speeds, and the need for gearboxes or frequency conversion electronics to couple their output to common power line frequencies of 50-60 Hertz.

Moreover, while expansion of the gas via a positive displacement mechanism effectively addresses the variable load, high differential velocity, and high speed issues, it has traditionally involved a sliding seal interface, such as a piston in a cylinder, or sliding vanes, scroll plates, or other wearing surfaces. This is undesirable because these types of systems typically have a limited operating life, introduce wear particles into the gas, or they may be excessively worn by particles already present and carried by the gas.

Thus, the application of energy recovery devices at gas pressure reducing stations has been limited.

SUMMARY OF THE INVENTION

A Gas Pressure Reduction Generator (GPRG) System is provided and includes a gas inlet configured to receive a pressurized gas flow from a gas supply, at least one expander in flow communication with the gas inlet to receive the pressurized gas flow, wherein the expander is operable to convert the pressurized gas flow into mechanical energy and a depressurized gas flow and a generator associated with said expander, wherein the generator is configured to convert the mechanical energy into electrical energy.

A Gas Pressure Reduction Generator (GPRG) System is provided and includes a gas inlet configured to receive a pressurized gas flow from a gas supply, a twin screw expander—either a single unit or cascading expanders, comprised of separate units of different sizes, with subsequent expanders being optimized for continued expansion of the gas from the outlet of previous units—in flow communication with the system gas inlet to receive the pressurized gas flow, wherein the expander is operable to convert the pressurized gas flow into mechanical energy and a depressurized gas flow. In one embodiment, the expander may utilize a pair of rotors having a special shape known as the N-profile rotor, which is optimized for predominately rolling contact, thus minimizing the sliding contact associated with other positive displacement mechanisms. The system may further include one or more generators, coupled singly or in multiples, that are associated with the expander(s) to receive the mechanical energy and convert the mechanical energy into electrical energy. This electrical energy which may then be stored, supplied locally, or distributed to the power grid.

A method for implementing a Gas Pressure Reduction Generator (GPRG) System is provided, wherein the Gas Pressure Reduction Generator System includes a gas inlet, an expander in flow communication with the gas inlet and a generator associated with the expander to generate electrical energy. The method includes introducing a gas flow into the GRPG System, governing the gas flow to generate a reduced pressure gas flow, wherein the reduced pressure gas flow has a pressure of about 13.4 bar; introducing the reduced pressure gas flow into the expander, operating the expander to generate mechanical energy and a depressurized gas flow, generating electrical energy by transferring the mechanical energy to an electrical generator and discharging the depressurized gas flow from the GRPG System.

A method for implementing a Gas Pressure Reduction Generator (GPRG) System is provided which may include combining lubricating oil with a gas, prior to the introduction of the gas to the expander inlet, to lubricate the expander. The oil may be combined with the gas by being injected into the gas pipeline such that the oil travels along the pipeline into the expander, thus coating the screws as the gas flows through the expander. This may be accomplished by introducing the oil directly into the pipeline through a tee, via a suitable nozzle or via any other method and/or device suitable to the desired end purpose. After expansion, the gas enters a separator/reservoir device which generates reconstituted oil by separating the lubricating oil from the depressurized gas flow. A pump then collects the reconstituted oil and raises its pressure for passage through a filter and heater and for re-introduction into the expander inlet.

A machine-readable computer program code is provided, wherein the program code includes instructions for causing a controller to implement a method for implementing a Gas Pressure Reduction Generator (GPRG) System, wherein the Gas Pressure Reduction Generator System includes a gas inlet, an expander in flow communication with the gas inlet and a generator associated with the expander to generate electrical energy. The method includes introducing a gas flow into the GRPG System, governing the gas flow to generate a reduced pressure gas flow, wherein the reduced pressure gas flow has a pressure of about 13.4 bar, introducing the reduced pressure gas flow into the expander, operating the expander to generate mechanical energy and a depressurized gas flow, generating electrical energy by transferring the mechanical energy to an electrical generator and discharging the depressurized gas flow from the GRPG System.

A machine-readable computer program code is provided, wherein the program code includes instructions for causing a controller to implement a method for implementing a Gas Pressure Reduction Generator (GPRG) System, wherein the Gas Pressure Reduction Generator System includes a gas inlet, an expander in flow communication with the gas inlet, a generator associated with the expander generate electrical energy and an oil separator device in flow communication with the expander. The method includes introducing a gas flow into the GRPG System, governing the gas flow to generate a reduced pressure gas flow, wherein the reduced pressure gas flow has a pressure of about 14.4 bar, introducing the reduced pressure gas flow into the expander such that the reduced pressure gas flow is combined with lubricating oil to lubricate the expander, operating the expander to generate mechanical energy and a depressurized gas flow, generating electrical energy by transferring the mechanical energy to an electrical generator, associating the depressurized gas flow with a separator/reservoir device to generated reconstituted oil by separating the lubricating oil from the depressurized gas flow and reintroducing the reconstituted oil into the expander.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION

Persons of ordinary skill in the art will realize that the following disclosure is illustrative only and not in any way limiting of the invention disclosed herein. Moreover, it should be appreciated that other embodiments of the invention will readily suggest themselves to such skilled persons having the benefit of this disclosure.

It should be appreciated that expanding a gas is typically associated with a local fall in temperature as the gas accelerates through any type of pressure reducing device. When this reduction in pressure is associated with power generation, this fall in temperature is typically permanent. However, when the pressure is reduced using a throttling valve(s), there is at least a chance for partial recovery of temperature as the depressurized gas decelerates downstream of the throttle valve(s). Furthermore, for ideal gases, such as compressed air at atmospheric temperature, the temperature recovery may be more or less complete. However, with real gases (e.g. hydrocarbons and their mixtures) at higher pressures, the gas is cooled (partially irrecoverably) due to a phenomenon known as the Joule-Thompson effect and its initial temperature can typically only be restored by the addition of heat. Because this temperature will often be below ambient, this can be used for refrigeration.

Figure 1:
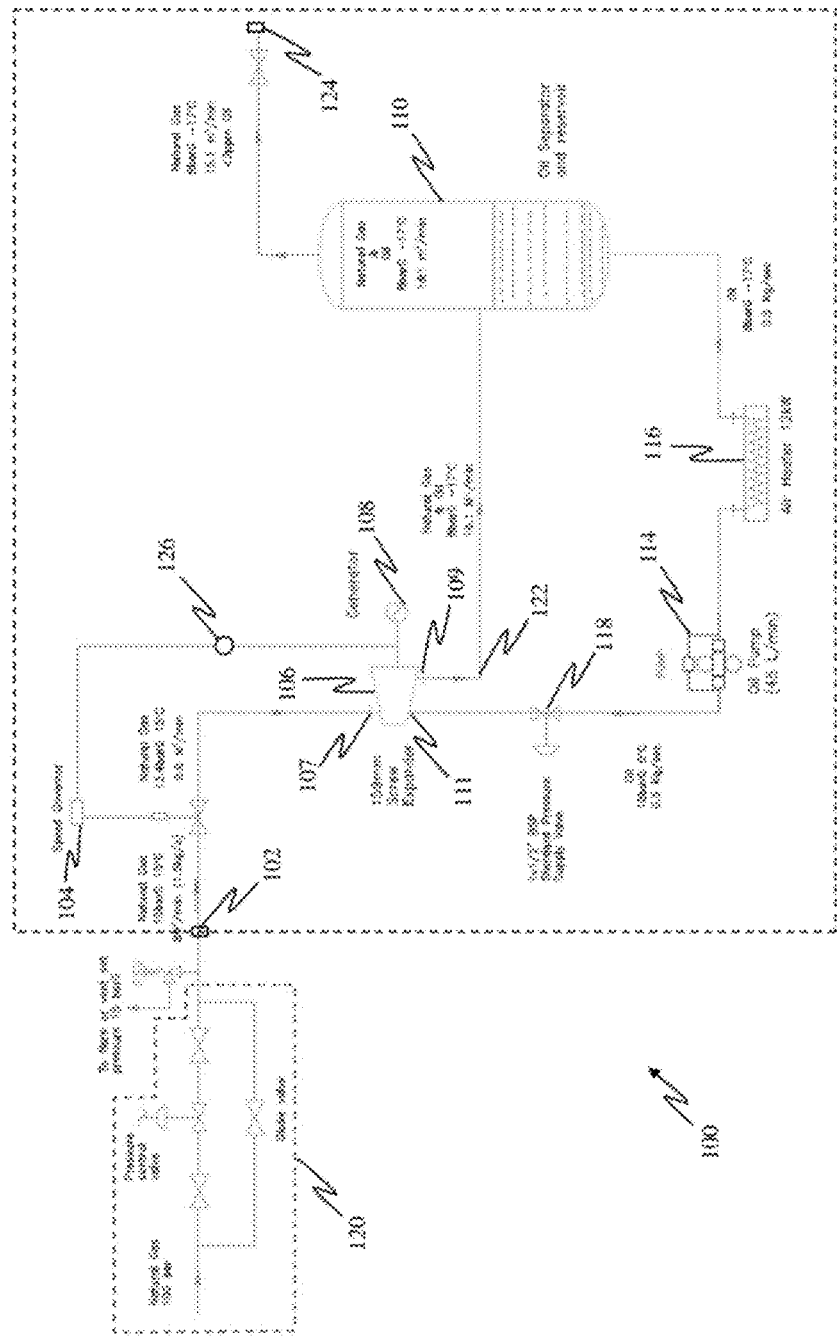
FIG. 1 is an overall schematic diagram of a Gas Pressure Reduction Generator System in accordance with one embodiment of the present invention.
Figure 2:
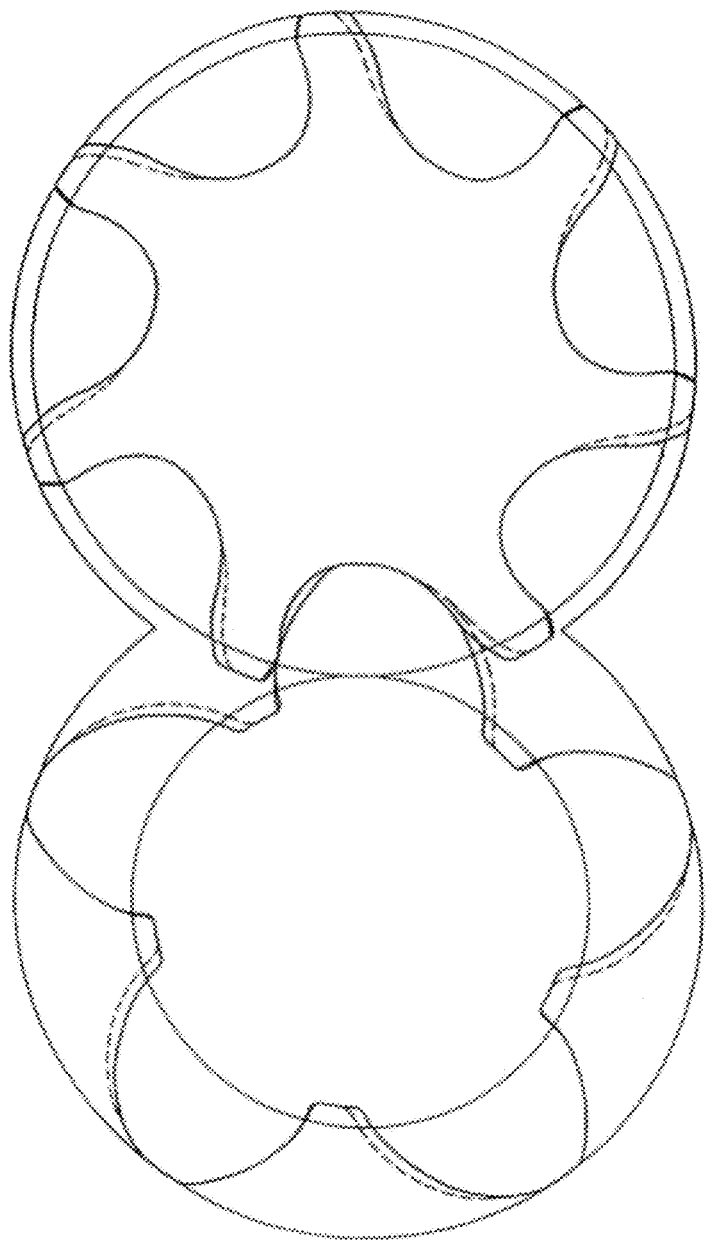
FIG. 2 is a cross-section view of N-profile rotors (screws) installed in a case used in an expander and illustrates the salient features of the N-profile rotors where the casing and front bearings are removed for clarity.

Referring to FIG. 1, a GPRG system 100 which uses an expander-generator combination for recovering power from a depressurization of natural gas (or other type of gas, is shown in accordance with one embodiment of the invention. It should be appreciated that the expander may be implemented using a twin-screw expander or the expander may be implemented using a screw compressor, suitably modified and configured to operate in reverse to act as an expander. In a preferred embodiment, the expander may utilize a pair of rotors having a special shape known as an N-profile rotor (See FIG. 2) such as described in U.S. Pat. No. 6,296,461, entitled "Plural Screw Positive Displacement Machines", which rotors are shaped to optimize for predominately rolling contact, thus minimizing the sliding contact associated with other positive displacement mechanisms. The GPRG system 100 includes a gas inlet 102, a speed governor 104, an expander 106, a generator 108, an oil separator/reservoir 110, an oil pump 114, an air heater 116 and an oil pressure regulating valve 118. The gas inlet 102 is configured to be in flow communication with a natural gas supply 120 and the speed governor 104, where the natural gas supply 120 supplies the flow of natural gas to the gas inlet 102 at a pressure of about 15 barG and a temperature of about 15° C.

The speed governor 104, which is also in flow communication with the expander 106 and signal communication with the generator 108, is configured to regulate the pressure of the gas flowing between the gas inlet 102 and the expander 106, as discussed further hereinafter. The expander 106 includes an expander inlet 107, an expander outlet 109 and an expander oil inlet 111, where the expander outlet 109 is in flow communication with the oil separator/reservoir 110 via a first path which is a direct gas flow line 122 as well as via a second path which includes the oil pump 114 and the air heater 116. Accordingly, the first path allows for natural gas & oil to flow from the expander 106 to the oil separator/reservoir 110, and the second path allows for the recovered oil to flow from the oil separator/reservoir 110 to the expander 106 to lubricate the expander 106. Moreover, the oil separator/reservoir 110 is further in flow communication with a gas output 124.

In accordance with one embodiment of the invention, the system 100 may operate as follows. As can be seen, the natural gas is introduced into the GPRG system 100 via gas inlet 102 at about 15 barG and passes through a speed governor 104 (i.e. control valve) before entering the expander 106, which may be lubricated at least partially by oil injection. It should be appreciated that a pressure drop of about 10% (between 9% and 11%) should be allowed in the speed governor 104 in order for it to exercise a proper control function, such that the natural gas enters the expander 106 at about 13.4 barG. The gas expanding through the screw expander 106 produces a mechanical shaft power output (i.e. causes the expander shaft to rotate), which is transferred to the electrical generator 108 via a belt drive, direct drive, gear train, magnetic coupling or some other method or device suitable to the desired end result, such as via a clutch device (such as for example, an electrical or mechanical clutch) as described in U.S. patent application Ser. No. 12/653,718 entitled "Power Compounder", the contents of which are incorporated by reference herein in its entirety.

In accordance with one embodiment of the invention, a coupling method may involve housing the expander and generator in a common casing, known in the refrigeration industry as semi-hermetic construction. As is well known, semi-hermetic construction is a technique that is employed with compressors (particularly for refrigeration) in which the motor (or generator) and compressor (or expander) share common pressure housing. And because the generator and expander are directly coupled via a common shaft that does not pass through the atmosphere, shaft seals are typically not needed. Thus, there are typically no rotating seal to leak, nor moving belts, pulleys or gears to generate static or sparks. For flammable gases in particular, this type of construction method obviates the need for a shaft seal and external moving parts. It should be appreciated that because the electrical output of the generator 108 typically must be produced at a constant frequency, the speed of the shaft of the expander 106 should be controlled. This may be achieved via a signal from a monitoring device 126 that measures the rotational speed of the shaft of the generator 108 and then sends that data to the speed governor 104. The speed governor 104 then regulates the rotational speed of the shaft of the expander 106 by altering the pressure of the gas flow. For example, if the speed governor 104 is a control valve, then the control valve can be adjusted to alter the gas flow pressure at the inlet of the expander 106.

The gas being introduced into the expander 106 is then expanded via any device and/or method suitable to the desired end purpose, such as described in U.S. Pat. No. 7,637,108 entitled "Power Compounder", the contents of which are incorporated herein by reference. At this point, the expanded gas leaving the expander 106 is directed to the separator/reservoir 110 via the direct gas flow line 122 and passes through the separator/reservoir 110 to remove at least a portion of the lubricating oil, before being discharged via the gas output 124, at a reduced pressure, where the reduced pressure is typically on the order of about 6 to about 8 barG. The separated/recovered oil, which is at a first temperature (inside of the separator/reservoir 110) that may be substantially below ambient temperature, is then passed through air heater 116 to be partially reheated by the heat transferred to it from the surrounding atmosphere. It should be appreciated that this reheating process may be necessary to avoid the possibility of excessively cold oil entering the expander. Oil significantly below the temperature of the surrounding atmosphere would have the effect of cooling the entire expander 106, including the gas undergoing expansion therein, which would reduce the power output and efficiency of the GPRG system 100. The partially reheated oil may then be re-pressurized and injected into the high pressure end of the expander 106 via the expander oil inlet 111 and the oil pressure regulating valve 118 which controls the flow of oil back into the expander 106. The re-pressurized oil then enters the working chamber of the expander 106 and may also be distributed to the bearings of the expander 106.

It should be appreciated that the expander 106 should be constantly lubricated. As power is recovered within the screw expander using a steady flow process with no recirculation of the working fluid (i.e. as in a closed cycle refrigeration system), it is typically not possible to lubricate the expander 106 by using a small amount of a mixed oil in the working fluid without recovery of the oil. Accordingly, the lubrication system in this embodiment operates with an oil separator 110 at the expander outlet to remove/recover the majority of the oil from the expanded gas. This recovered oil is then deposited into a reservoir 110. It should be appreciated that the recovered oil (i.e. in the separator/reservoir 110), which has a temperature substantially similar to the temperature at the expander exit, should be at least partially reheated to reduce its viscosity and to minimize any required heating of the inlet gas. It should be appreciated that the separator/reservoir 110 may be combined into one unit or the separator/reservoir 110 may include a reservoir that is separate from the separator.

In another embodiment, lubrication may be provided only to the external gears and bearings which are isolated from the gas flow. Thus, because the screws (rotors) are synchronized by these external gears, which prevent rotor contact, this may obviate the need for mixing oil with the gas and thus obviate the need for the subsequent use of an oil separator/reservoir.

In still yet another embodiment, the bearings may be of the type that are sealed and permanently lubricated, and one or both of the rotors may be coated with or comprised of self-lubricating, low-wear materials (e.g. any of several polymers or composites thereof, such as PTFE or polyamide-imide). In some cases, one of rotors may be coated with and/or constructed from a material that is different from the other rotor. Such construction may obviate the need for oil in any part of the machine. Thus, there would be no need to mix oil with the gas or use an oil separator.

Figure 3:
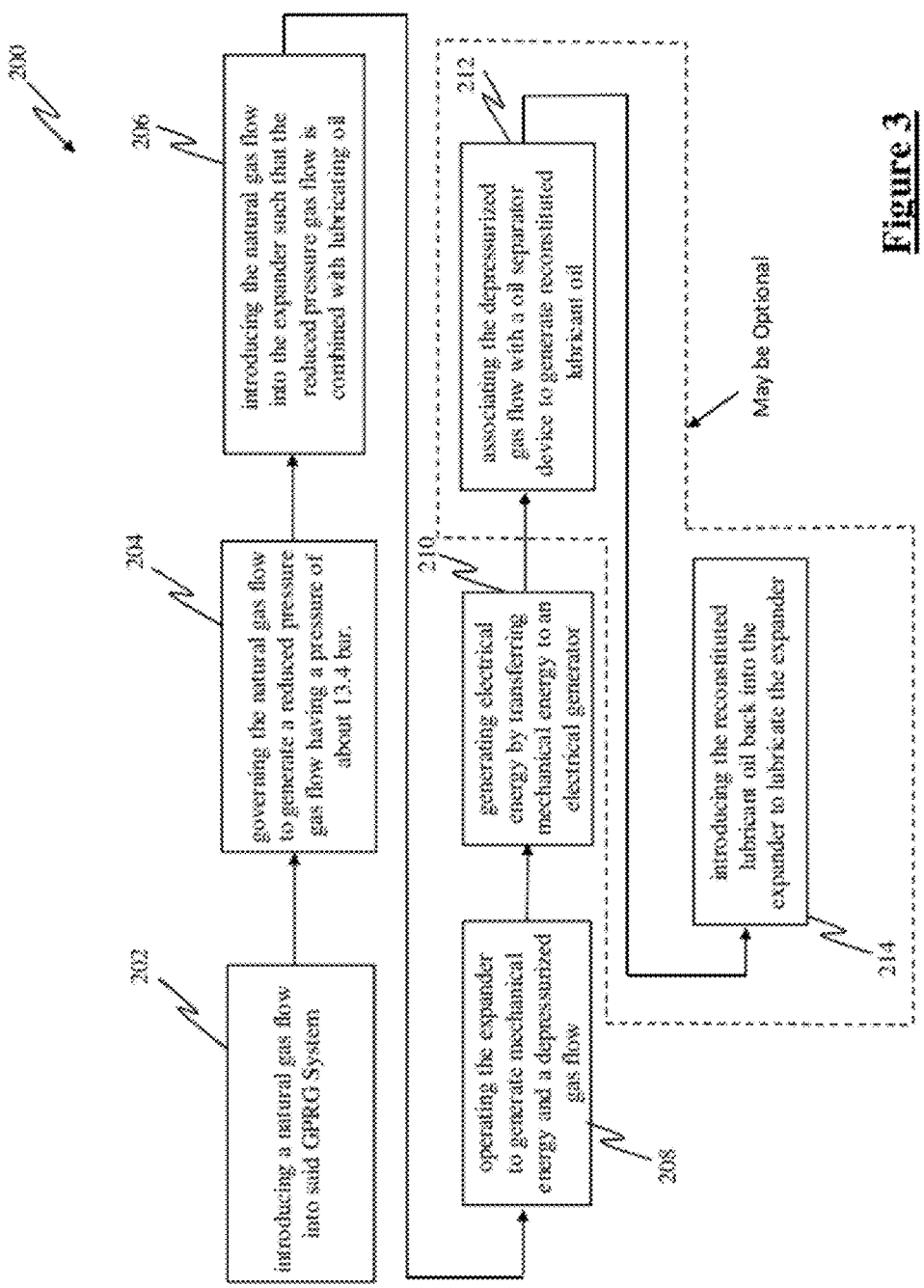
FIG. 3 is an overall block diagram illustrating one embodiment of a method of implementing the GPRG System of FIG. 1 in accordance with the invention.

Referring to FIG. 3, a block diagram illustrating a method 200 for implementing the GRPG System 100 is illustrated and includes introducing a gas flow into the gas inlet 102 of the GRPG System 100 as shown in operational block 202. The gas flow may be governed via the speed governor 104 to generate a reduced pressure gas flow such that the pressure of the reduced pressure gas flow (i.e. gas flow after the speed governor 104) is about 13.4 barG (may range from about 10 barG to about 20 barG) as shown in operational block 204. The reduced pressure gas flow is then introduced into the expander 106 and combined with lubricating oil to lubricate the expander 106 during the expansion process, as shown in operational block 206, where the reduced pressure gas flow is then processed to generate mechanical energy as shown in operational block 208. This may be accomplished by operating the expander 106 to expand the reduced pressure gas flow to generate a depressurized gas flow and to cause an expander shaft to rotate. This mechanical/rotational energy is then used to drive the electrical generator 108 to generate electrical power, as shown in operational block 210. The depressurized gas flow may then be discharged from the GRPG System 100 as shown in operational block 212.

It should be appreciated that in one embodiment of the method, the reduced pressure gas flow may be introduced into the expander 106 and combined with lubricating oil to lubricate the expander 106 during the expansion process. The depressurized gas flow may then be directed to flow into the separator/reservoir 110 which separates and reconstitutes (i.e. recovers) the previously combined oil from the depressurized gas flow and discharges the "de-oiled" depressurized gas flow. The reconstituted oil may then be processed (reheated and/or re-pressurized), directed to the inlet port of the expander 106 and reintroduced back into the expander 106 to lubricate the expander 106 during operation. The reconstituted oil may be processed by heating the reconstituted oil and pumping the heated reconstituted oil to the inlet of the expander 106, where the pressure of the oil flow back to the expander 106 may be regulated by the oil pressure regulating valve 118. It should also be appreciated that although the invention is described herein in terms of natural gas, the invention may be used with any type of gas suitable to the desired end purpose.

In another embodiment of the method, the external gears and bearings of the expander 106, which are isolated from the gas flow, may be lubricated from an external source during the operation of the expander 106. And because the screws (rotors) are synchronized by these external gears, which prevent rotor contact, the need for mixing oil with the gas and the need for the subsequent use of an oil separator/reservoir are obviated. Thus, in this embodiment there would be no need to mix oil with the gas flow or to use an oil separator.

In still yet another embodiment of the method, the bearings used in the expander 106 may be of the type that are sealed and permanently lubricated and the rotors may be coated with and/or constructed from self-lubricating, low-wear materials (e.g. any of several polymers or composites thereof, such as PTFE or polyamide-imide). In this embodiment, the use of these materials may obviate the need for oil in any part of the machine. Thus, in this embodiment there would be no need to mix oil with the gas flow or to use an oil separator/reservoir.

A machine-readable computer program code and/or a medium encoded with a machine-readable computer program code for implementing the GRPG System 100 is provided, wherein the code and/or medium includes instructions for causing a controller to implement the method 200. In accordance with an exemplary embodiment, the processing of the method of FIG. 3 may be implemented by a controller disposed internal, external or internally and externally to GPRG System 100. In addition, processing of FIG. 3 may be implemented through a controller operating in response to a computer program. In order to perform the prescribed functions and desired processing, as well as the computations therefore (e.g. execution control algorithm(s), the control processes prescribed herein, and the like), the controller may include, but is not be limited to, a processor(s), computer(s), memory, storage, register(s), timing, interrupt(s), communication interface(s), transducers(s), and input/output signal interface(s), as well as combination comprising at least one of the foregoing.

It should be appreciated that the method of the invention may be embodied in the form of a computer or controller implemented processes. The method of the invention may also be embodied in the form of computer program code containing instructions embodied in tangible media, such as floppy diskettes, CD-ROMs, hard drives, non-volatile memory, and/or any other computer-readable medium, wherein when the computer program code is loaded into and executed by a computer or controller, the computer or controller becomes an apparatus for practicing the invention. The method of the invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A gas pressure reduction generator system comprising in combination:
   A. a pressurized gas flow inlet;
   B. one or more expander/generator apparatuses, each such expander/generator apparatus separately comprising:
      (i) a pressurized gas expander including a pressurized gas expander inlet in pressurized gas flow communication with the pressurized gas flow inlet, and a reduced pressure gas expander outlet;
      (ii) an electric power generator in mechanical power receiving communication with the pressurized gas expander, said electric power generator configured to generate and deliver constant frequency alternating current electric power to an electrical load; and
      (iii) a lubrication system comprising an oil separator/reservoir in input oil flow communication with the reduced pressure gas expander outlet and in output oil flow communication with the pressurized gas expander via an oil heater and an oil pump.

2. The gas pressure reduction generator system of claim 1 wherein at least one expander/generator apparatus is configured to generate and deliver constant frequency alternating current electric power to an electrical load by further comprising a rotational speed monitoring device and a rotational speed governor.

3. The gas pressure reduction generator system of claim 1 wherein at least one expander/generator apparatus comprises a screw expander in power delivery communication with the electric power generator.

4. The gas pressure reduction generator system of claim 1 wherein the oil heater is disposed between the oil separator/reservoir and the oil pump.

5. The gas pressure reduction generator system of claim 1 wherein the oil pump is disposed between the oil separator/reservoir and the oil heater.

6. A gas pressure reduction generator system comprising:
   A. a pressurized system gas flow inlet configured to receive pressurized gas from a gas supply;
   B. a pressurized gas rotational speed governor in pressurized gas flow communication with the pressurized system flow gas inlet;
   C. one or more pressurized gas expander(s), each pressurized gas expander separately comprising:
      (i) a pressurized gas expander inlet in pressurized gas flow communication with the pressurized gas rotational speed governor,
      (ii) a rotating pressurized gas expander shaft,
      (iii) a pressurized gas expander shaft rotation monitor in communication with the pressurized gas rotational speed governor, wherein the rotational speed of the rotating pressurized gas expander shaft is controlled by the pressurized gas rotational speed governor in communication with the pressurized gas rotational speed monitor, and (iv) a reduced pressure gas expander outlet;

D. a reduced pressure system gas flow outlet in reduced pressure gas flow receiving communication with at least one reduced pressure gas expander outlet of the one or more pressurized gas expanders; and E. one or more alternating current electric power generator(s) in power receiving communication with at least one pressurized gas expander via the rotating expander shaft of said pressurized gas expander and in alternating current electric power delivery communication with at least one electric power load, wherein the frequency of at least one of the one or more alternating current electric power generator(s) is determined by the speed of the rotating expander shaft.

7. The system of claim 6 wherein the pressurized gas received from the gas supply comprises natural gas.

8. The system of claim 7 wherein the pressurized gas expander shaft rotation monitor of at least one of the one or more pressurized gas expanders is in communication with the pressurized gas rotational speed governor.

9. The gas pressure reduction generator system of claim 7 wherein the pressurized gas rotational speed governor is in data communication with the pressurized gas expander shaft rotation monitor of at least one of the one or more pressurized gas expanders.

10. The system of claim 7 wherein at least one of the one or more pressurized gas expander(s) further comprises a lubricant oil inlet in lubricant providing communication with a working chamber and one or more bearings of the pressurized gas expander.

11. The system of claim 10 further comprising an oil separator system in (a) gas and oil flow receiving communication with at least one reduced pressure gas expander outlet of the one or more pressurized gas expander(s), and (b) oil supplying communication with at least one lubricant oil inlet of the one or more pressurized gas expander(s).

12. The system of claim 11 wherein the oil separator system further comprises an oil heater and an oil pump.

13. The system of claim 11 wherein the oil separator system includes a reduced pressure gas and oil reservoir in reduced pressure gas and oil receiving communication with at least one reduced pressure gas expander outlet of the one or more pressurized gas expander(s).

14. The system of claim 7 wherein at least one of the one or more pressurized gas expander(s) comprises a screw expander.

15. The system of claim 14 wherein the at least one screw expander comprises an N-profile rotor.

16. The system of claim 6 wherein the pressurized gas expander shaft rotation monitor of at least one of the one or more pressurized gas expanders is in communication with the pressurized gas rotational speed governor.

17. The gas pressure reduction generator system of claim 6 wherein the pressurized gas rotational speed governor is in data communication with the pressurized gas expander shaft rotation monitor of at least one of the one or more pressurized gas expanders.

18. The system of claim 6 wherein at least one of the one or more pressurized gas expander(s) further comprises a lubricant oil inlet in lubricant providing communication with a working chamber and one or more bearings of the pressurized gas expander.

19. The system of claim 18 further comprising an oil separator system in (a) gas and oil flow receiving communication with at least one reduced pressure gas expander outlet of the one or more pressurized gas expander(s), and (b) oil supplying communication with at least one lubricant oil inlet of the one or more pressurized gas expander(s).

20. The system of claim 19 wherein the oil separator system further comprises an oil heater and an oil pump.

21. The system of claim 19 wherein the oil separator system includes a reduced pressure gas and oil reservoir in reduced pressure gas and oil receiving communication with at least one reduced pressure gas expander outlet of the one or more pressurized gas expander(s).

22. The system of claim 6 wherein at least one of the one or more pressurized gas expander(s) comprises a screw expander.

23. The system of claim 22 wherein the at least one screw expander comprises an N-profile rotor.

24. A method of reducing gas pressure and generating electrical power comprising:

A. receiving a pressurized gas flow;
B. receiving a flow of lubricating oil;
C. introducing the pressurized gas flow into a pressurized gas expander;
D. introducing the flow of lubricating oil into the pressurized gas expander, thereby combining it with the pressurized gas flow;
E. expanding the pressurized gas flow in the pressurized gas expander and generating mechanical power and a reduced pressure gas flow;
F. communicating the mechanical power to an electric generator;
G. separating lubricating oil from the reduced pressure gas flow, heating the lubricating oil, and creating the flow of lubricating oil; and
H. delivering the reduced pressure gas flow to a reduced pressure gas outlet.

25. The method of claim 24 wherein the pressurized gas flow comprises a pressurized flow of natural gas.

26. The method of claim 25, wherein the steps (E) and (F) of expanding, generating, and communicating further comprise (i) causing an expander shaft to rotate, and (ii) transferring rotational energy from said rotating expander shaft to a rotating shaft in the electric generator.

27. The method of claim 25 wherein the separating portion of step (G) further comprises delivering the reduced pressure gas and oil flow to a reduced pressure gas and oil reservoir.

28. The method of claim 24, wherein the steps (E) and (F) of expanding, generating, and communicating further comprise (i) causing an expander shaft to rotate, and (ii) transferring rotational energy from said rotating expander shaft to a rotating shaft in the electric generator.

29. The method of claim 24 wherein the separating portion of step (G) further comprises delivering the reduced pressure gas and oil flow to a reduced pressure gas and oil reservoir.

30. A method of reducing gas pressure and generating electrical power comprising:

A. receiving a pressurized gas flow;
B. receiving a flow of lubricating oil;
C. introducing the pressurized gas flow into a pressurized gas expander;
D. introducing the flow of lubricating oil into the pressurized gas expander, thereby combining it with the pressurized gas flow;
E. expanding the pressurized gas flow in the pressurized gas expander and generating mechanical power and a reduced pressure gas flow;

F. monitoring the rotational speed of the expander shaft and controlling said rotational speed via a pressurized gas rotational speed governor;

G. communicating the mechanical power to an electric generator;

H. separating lubricating oil from the reduced pressure gas flow and creating the flow of lubricating oil; and I. delivering the reduced pressure gas flow to a reduced pressure gas outlet.

31. The method of claim 30 wherein the pressurized gas flow comprises a pressurized flow of natural gas.

32. The method of claim 31 wherein the step H of separating lubricating oil from the reduced pressure gas flow further comprises heating the lubricating oil.

33. The method of claim 31, wherein the steps (E) and (G) of expanding, generating, and communicating further comprise (i) causing an expander shaft to rotate, and (ii) transferring rotational energy from said rotating expander shaft to a rotating shaft in the electric generator.

34. The method of claim 31 wherein the separating portion of step (H) further comprises delivering the reduced pressure gas and oil flow to a reduced pressure gas and oil reservoir.

35. The method of claim 30 wherein the step H of separating lubricating oil from the reduced pressure gas flow further comprises heating the lubricating oil.

36. The method of claim 30, wherein the steps (E) and (G) of expanding, generating, and communicating further comprise (i) causing an expander shaft to rotate, and (ii) transferring rotational energy from said rotating expander shaft to a rotating shaft in the electric generator.

37. The method of claim 30 wherein the separating portion of step (H) further comprises delivering the reduced pressure gas and oil flow to a reduced pressure gas and oil reservoir.

* * * * *